US011233973B1

(12) United States Patent
Ishimoto

(10) Patent No.: US 11,233,973 B1
(45) Date of Patent: Jan. 25, 2022

(54) MIXED-REALITY TELECONFERENCING ACROSS MULTIPLE LOCATIONS

(71) Applicant: International Business Machines Corporation, Armonk, NY (US)

(72) Inventor: Kenya Ishimoto, Machida (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/936,735

(22) Filed: Jul. 23, 2020

(51) Int. Cl.
| | |
|---|---|
| G06F 3/048 | (2013.01) |
| H04N 7/15 | (2006.01) |
| H04L 12/18 | (2006.01) |
| G06T 19/00 | (2011.01) |
| H04S 7/00 | (2006.01) |
| G06T 13/40 | (2011.01) |
| G06F 3/01 | (2006.01) |

(52) U.S. Cl.
CPC ............ *H04N 7/157* (2013.01); *G06T 13/40* (2013.01); *G06T 19/006* (2013.01); *H04L 12/1822* (2013.01); *H04L 12/1827* (2013.01); *H04S 7/303* (2013.01)

(58) Field of Classification Search
CPC .... G06F 3/0481; G06F 3/011; G06F 3/04815; A63F 13/57; H04N 7/157; G06T 13/40; G06T 19/006; H04L 12/1822; H04L 12/1827; H04S 7/303
See application file for complete search history.

(56) References Cited

U.S. PATENT DOCUMENTS

| | | | | |
|---|---|---|---|---|
| 7,119,819 | B1 * | 10/2006 | Robertson | ........... G06F 3/04815 715/782 |
| 7,542,040 | B2 * | 6/2009 | Templeman | ............ G06F 3/011 345/474 |
| 8,223,186 | B2 * | 7/2012 | Derocher | ................. H04N 7/15 348/14.01 |
| 9,007,427 | B2 * | 4/2015 | Hoover | .................. H04N 7/157 348/14.16 |

(Continued)

FOREIGN PATENT DOCUMENTS

| | | |
|---|---|---|
| CN | 103116451 A | 5/2013 |
| CN | 104036476 A | 9/2014 |

(Continued)

OTHER PUBLICATIONS

Anonymous, "Mixed Reality Teleconferencing," http://virtual.vtt.fi/virtual/proj2/multimedia_old/projects/mrconference.html. Jul. 13, 2018. 1 Page.

(Continued)

*Primary Examiner* — Nicholas Augustine
(74) *Attorney, Agent, or Firm* — Cantor Colburn LLP; Teddi Maranzano

(57) ABSTRACT

Aspects of the invention include overlaying a graphical representation of a first user onto a real-world image of a first location, wherein the first user is physically located at a second location different than the first location. Detecting an interaction between the first user and a second user, wherein the second user is physically located at the first location. Determining a current position of the second user within the first location. Causing the graphical representation of the first user to face in a direction of the current position of the second user.

11 Claims, 9 Drawing Sheets

(56) References Cited

U.S. PATENT DOCUMENTS

| | | | |
|---|---|---|---|
| 9,065,976 B2* | 6/2015 | Hegde | H04N 7/157 |
| 9,244,533 B2* | 1/2016 | Friend | G06F 3/017 |
| 9,696,795 B2* | 7/2017 | Marcolina | G06T 19/006 |
| 9,996,797 B1* | 6/2018 | Holz | G06F 3/04842 |
| 10,182,210 B1 | 1/2019 | Goetzinger | |
| 10,262,462 B2* | 4/2019 | Miller | A63F 13/57 |
| 10,516,853 B1* | 12/2019 | Gibson | G06T 7/73 |
| 2011/0279634 A1 | 11/2011 | Periyannan | |
| 2012/0249741 A1* | 10/2012 | Maciocci | G06T 15/503 |
| | | | 348/46 |
| 2014/0063061 A1* | 3/2014 | Reitan | G09G 3/003 |
| | | | 345/633 |
| 2014/0082526 A1* | 3/2014 | Park | H04L 67/38 |
| | | | 715/757 |
| 2014/0253592 A1 | 9/2014 | Cho | |
| 2014/0282105 A1* | 9/2014 | Nordstrom | G09B 19/003 |
| | | | 715/753 |
| 2015/0213650 A1 | 7/2015 | Barzuza | |
| 2015/0371447 A1 | 12/2015 | Yasutake | |
| 2017/0185261 A1* | 6/2017 | Perez | G06F 3/04815 |
| 2018/0131907 A1* | 5/2018 | Schmirler | G05B 23/0216 |
| 2018/0357472 A1* | 12/2018 | Dreessen | G06T 3/60 |
| 2019/0087015 A1* | 3/2019 | Lam | G06F 1/1686 |
| 2019/0310758 A1* | 10/2019 | Agarawala | H04L 67/22 |
| 2020/0053318 A1 | 2/2020 | Li et al. | |
| 2020/0110928 A1* | 4/2020 | Al Jazaery | G06K 9/00335 |
| 2020/0117267 A1* | 4/2020 | Gibson | G06T 15/20 |
| 2020/0117270 A1* | 4/2020 | Gibson | G06T 17/00 |
| 2021/0008413 A1* | 1/2021 | Asikainen | G06F 3/011 |
| 2021/0041951 A1* | 2/2021 | Gibson | G06F 3/012 |

FOREIGN PATENT DOCUMENTS

| | | |
|---|---|---|
| CN | 105653849 A | 6/2016 |
| CN | 109905754 A | 6/2019 |
| WO | 2014114132 A1 | 7/2014 |
| WO | 2017030985 A1 | 2/2017 |

OTHER PUBLICATIONS

International Search Report; International Application No. PCT/CN2021/107005; International Filing Date: Jul. 19, 2021; dated Oct. 27, 2021; 10 pages.

* cited by examiner

US 11,233,973 B1

MIXED-REALITY TELECONFERENCING ACROSS MULTIPLE LOCATIONS

BACKGROUND

The present invention generally relates to computer processing systems, and more specifically, to computing processing systems that enable mixed-reality teleconferencing across multiple locations.

Computer systems can generate a mixed-reality user experience by overlaying digitally created objects over a real-world environment on a user's computer display. A mixed-reality experience enables the user to interact with the digitally created objects and real-world objects. Mixed-reality differs from virtual reality and augmented reality based primarily on the level of interaction available between the user and the displayed environment. Virtual reality is a display technology, in which computing systems create a completely simulated environment. Users can interact with objects in the simulated environment, but not with real-world objects. Augmented reality is a display technology, in which a computer system creates an enhanced environment by overlaying computer-generated perceptual information over a real-world environment. Users can interact with real-world objects but cannot interact with the computer-generated perceptual information.

SUMMARY

Embodiments of the present invention are directed to mixed-reality teleconferencing across multiple locations. A non-limiting example computer-implemented method includes overlaying a graphical representation of a first user onto a real-world image of a first location, wherein the first user is physically located at a second location different than the first location. Detecting an interaction between the first user and a second user, wherein the second user is physically located at the first location. Determining a current position of the second user within the first location. Causing the graphical representation of the first user to face in a direction of the current position of the second user.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
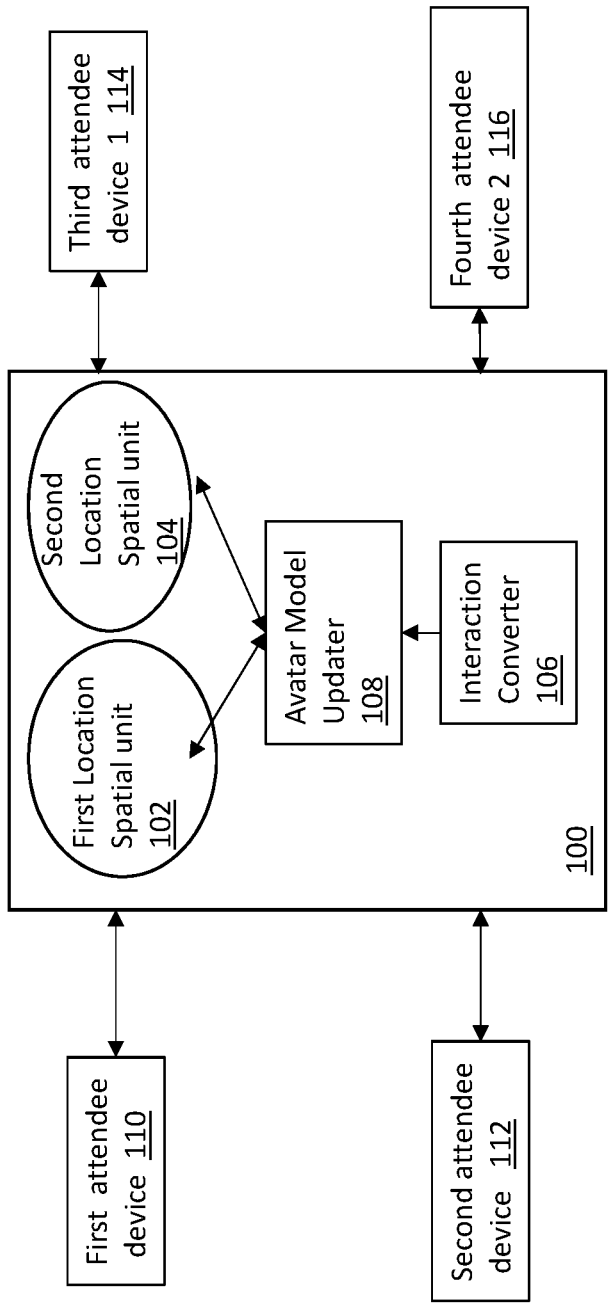
FIG. 1 illustrates a block diagram of components of system for generating a mixed-reality teleconference in accordance with one or more embodiments of the present invention.

The diagrams depicted herein are illustrative. There can be many variations to the diagrams or to the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide a computing system that generates a mixed-reality teleconference for attendees at multiple locations. Attendees can use computing devices to view three-dimensional graphical representations (e.g., avatars) of other attendees who are not physically present. The system accounts for a positioning of each attendee at each location, and therefore, if an attendee at one location interacts with an attendee at another location, the computer system controls their respective avatars to face each other, regardless of the actual physical positioning of the attendees.

Conventional computer-based teleconference systems can generate a teleconference space, in which a three-dimensional representation (e.g., an avatar) of a remote attendee, who is not physically present, is overlaid on an image of the real-world teleconference location. This mixed-reality image can be viewed by an attendee through a mixed-reality display of a mobile computing device, for example, a head mounted display (HMD), a tablet display, or a smartphone display. Unfortunately, conventional mixed-reality systems, merely cause an avatar to directly mimic the actual movements of attendees without regard to a positioning of other attendees. Conventional mixed-reality systems do not take into account whether the avatar's motion conforms to a natural interaction between two teleconference attendees.

For example, a first attendee at a first location may interact with a second attendee at a second location. Each attendee is represented by an avatar at the other location from which they are physically present. In this situation, the first attendee may turn their body to the right to rotate their device and view an avatar of the second attendee. In a conventional system, if the first attendee turns to the right to see a display of the second attendee's avatar, the second attendee using their mobile computing device will see an avatar of the first attendee turning to their right. Unfortunately, if at the second location, the second attendee is actually to the left of the first attendee's avatar, the first attendee's avatar will be facing the wrong direction, and the interaction will not appear natural.

One or more embodiments of the present invention address one or more of the above-described shortcomings by providing a computer-based teleconferencing system that maps the positions of remote attendees without restriction in the physical layout of the mixed-reality space of each location. The computer-based system converts the interactions between virtual and actual attendees to mimic interactions as if each attendee were present at each location regardless of the positional relationship the attendees. The computer-based teleconference system allows for efficient space usage at each location while maintaining natural interactions.

Turning now to FIG. 1, a system 100 for generating a mixed-reality teleconference is generally shown in accordance with one or more embodiments of the present invention. In general, the system 100 operates to create a mixed-reality teleconference for attendees at remotes locations. The system 100 includes a first location spatial unit 102 and a second location spatial unit 104. Each of the first and second location spatial units 102 104 are operable to receive topological, geometric, or geographic features for respective locations to identify the dimensions and spatial relationship between objects at each location. Each of the first and second location spatial unit 102 104 are further operable to overlay a computer-generated graphical representation (avatar) of an attendee onto a visual display of each real-world location. A real-world location includes the space populated by solid, liquid, and gaseous objects. For example, a conference room in an office building in which an attendee is physically present. The system 100 also includes an interaction converter 106 for receiving and analyzing data to determine which attendee(s) is interacting with which attendee(s). The system 100 also includes an avatar model updater 108 for receiving data from the interaction converter 106 and generating input data to conform a movement of an avatar to a natural movement during an interaction. With respect to the description below, FIG. 1 depicts a system 100 in operable communication with a first and second attendee device 110 112 at a first location and a third and fourth attendee device 114 116 at a second location. However, the system 100 can accommodate as many remote locations as are participating in a teleconference. The system 100 and the first attendee device 110 are described in further detail with reference to FIG. 2 below. The description of the first attendee device 110 is applicable to any of the second, third, and fourth attendee device 112 114 116.

Figure 2:
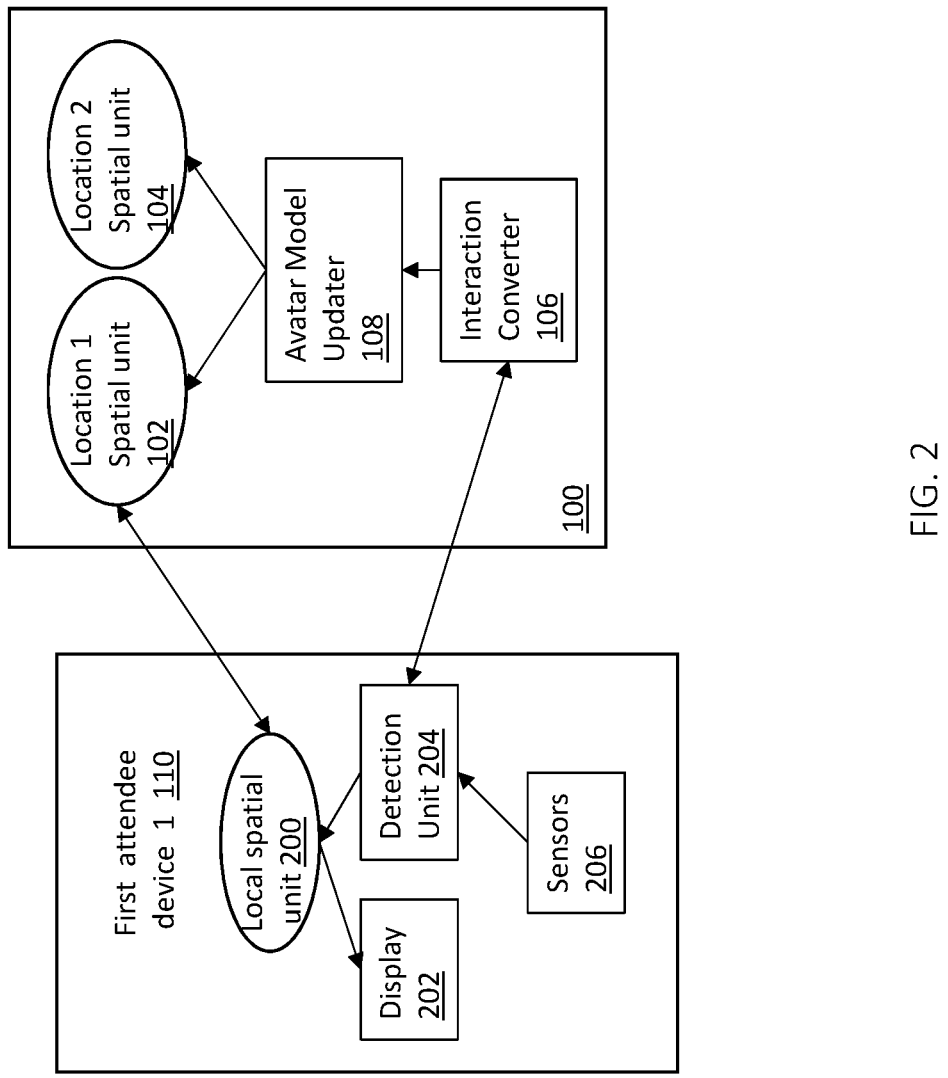
FIG. 2 illustrates a block diagram of components of system for generating a mixed-reality teleconference in accordance with one or more embodiments of the present invention.

Referring to FIG. 2, the system 100 includes a first location spatial unit 102 operable to receive and aggregate data from a plurality of attendee devices 110 112. The first location spatial unit 102 is further operable to employ computer vision techniques on the aggregated data for object detection. Object detection includes both image classification and object localization. Image classification includes predicting a class of one or more objects in an image. To perform image classification, the first location spatial unit 102 receives an image as an input and outputs a class label in the form of one or more integer values mapped to class values. Object localization includes identifying a location of the one or more identified objects in the image. To perform object localization, the first location spatial unit 102 can process the received image and output one or more bounding boxes, which define a spatial relationship of the objects in the image. Through object detection, the first location spatial unit 102 builds a three-dimensional spatial model to identify objects at a teleconference location. For example, the first location spatial unit 102 can use the model to identify an attendee, furniture, and visual aids.

In some embodiments of the present invention, the first location spatial unit 102 can apply machine learning techniques to perform object detection. In an exemplary embodiment, the first location spatial unit 102 employs a trained artificial neural network, for example, a region-based convolutional neural network (R-CNN). The R-CNN generally operates in three phases. First, the R-CNN analyzes images and extracts independent regions in the images and delineates the regions as candidate bounding boxes. Second, the R-CNN extracts features, for example, using a deep convolutional neural network, from each region. Third, a classifier, for example, a support vector machine (SVM), is used to analyze the features and predict a class for one or more objects in a region. In other embodiments, the first location spatial unit 102 is another form of a neural network than an R-CNN.

As used herein, "machine learning" broadly describes a function of electronic systems that learn from data. A machine learning system, engine, or module can include a machine learning algorithm that can be trained, such as in an external cloud environment (e.g., the cloud computing environment 50), to learn functional relationships between inputs and outputs that are currently unknown. In one or more embodiments, machine learning functionality can be implemented using an artificial neural network (ANN), having the capability to be trained to perform a currently unknown function. In machine learning and cognitive science, ANNs are a family of statistical learning models inspired by the biological neural networks of animals, and in particular, the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons is then passed to other downstream neurons, which are often referred to as "hidden" neurons. This process is repeated until an output neuron is activated. The activated output neuron determines which character was read.

The first location spatial unit 102 is further operable to receive an avatar model of each attendee and incorporate the model with a local spatial model. The first location spatial unit 102 inputs features of the location into the avatar model. The features are extracted from images from each attendee's device, and a position and viewing angle of each attendee's device. The first location spatial unit 102 inputs this data to synthesize an avatar with objects detected in the real-world image to overlay an avatar over the real-world image. An appearance of each avatar is based at least on part on a position and viewing angle of each attendee's device. For example, based on a viewing angle of an attendee's device, a top view of an avatar may be displayed, a bottom view may be displayed, or a side view may be displayed.

The first location spatial unit 102 further determines a position of each avatar, based at least in part on a physical layout of the real-world location at which the avatar is to be displayed. For example, a first and a second attendee at a first location are situated at a first square table across from each other. A third attendee and a fourth attendee are at a second location and also situated at a second square table but seated at adjacent sides of the table. At the first location, the first location unit overlays avatars of the third and fourth attendees across from each other at the empty sides of the square table. At the second location, a second location spatial unit 104 overlays avatars of the first and second attendees at the empty adjacent sides of the table. Therefore, regardless of the actual positioning of attendees, the avatars positioning is converted to a natural positioning during a teleconference.

The interaction converter 106 is operable to receive interaction data from the first attendee device 110. The interaction data is used to determine which attendee is interacting with which attendee. The interaction data can include data describing an avatar of a first attendee being visible on a second attendee device's display. The interaction data can further include data describing an avatar of the second attendee being visible on the first attendee device's display. Based on the determination that a time interval that each avatar remained on the other attendee display exceeds a threshold time, the interaction converter 106 can conclude that the two attendees are interacting. The determination can also be based on a time interval that an avatar of a single attendee displayed on another attendee's device exceeds a threshold time.

The interaction data can include a position and direction of the first attendee device. The position and direction data can include data describing an x-, y-, and z-direction of the first attendee device. The interaction converter 106 analyzes the position and direction data and data from other attendee devices to determine which attendee the user of the first attendee device 110 is interacting with and the position of the user. For example, the first attendee device 110 can include magnetic and gravity-field sensors that can calculate the direction of magnetic north and the downward direction at the first attendee device's location. The interaction converter 106 can use the global positioning system (GPS) coordinates of the first attendee device 110's location and a global map of the angle between true north and magnetic north, the interaction converter 106 calculates the required correction angle for true north. The interaction converter 106 uses this calculation to determine a position of the first attendee device 110, and a result a direction the first attendee device 110 is facing. Based on a direction the first attendee device is facing, the interaction converter 106 applies the three-dimensional spatial model to determine which attendee's avatar would be positioned in the direction of the first attendee device 110.

The avatar model updater 108 is operable to translate the determination of interacting attendees and generate inputs for the avatar models of the interacting attendees. The avatar model updater 108 transmits the inputs to the first and second location spatial units 102 104 which respectively update the avatar models for the interacting attendees. In response, the avatar models provide outputs to translate the inputs into motions for the respective avatars.

The first attendee device 110 is a mobile computing device and capable of being physically guided by the first attendee. The first attendee device 110 can include a head mounted display (HMD). The HMD is a display device mountable on a head of an attendee. The first attendee device 110 can also include a smartphone, tablet, or other computing device. The first attendee device 110 includes a local spatial unit 200. The local spatial unit 200 is operable to receive a captured data from a plurality of sensors 206 and employ computer vision techniques for object detection. The local spatial unit 200 is similar to the first location spatial unit 102. However, the local spatial unit 200 receives data from a plurality of sensors 206 rather than a plurality of attendee devices 110 112. Furthermore, local spatial unit 200 can aggregate data from the sensors 206 to generate a three-dimensional spatial model of a teleconference location. Whereas the first location spatial unit 102 can aggregate data from a plurality of attendee devices 110 112 to generate a shared three-dimensional spatial model of the teleconference location.

The first attendee device 110 includes a display 202. The display 202 is a miniaturized display device that is operable to display computer generated imagery combined with real-world imagery, for example, a teleconference location. The image displayed on the display 202 is based on a field of view of an image capturing sensor 206 of the first attendee device 110. The field of view is the extent of the real-world observable through a display of the first attendee device 110. During operation, the display 202 shows a physical location including any attendees physically present at the location, and avatars of attendees at other locations. As a user manipulates a position of the first attendee device 110, the image displayed changes. A teleconference attendee views the mixed-reality teleconference through the display 202.

The first attendee device 110 includes a detection unit 204. The detection unit 204 is operable to receive location and motion data to determine whether the location or motion data suggests that an attendee is interacting with another attendee. The detection unit 204 is further operable to determine that a motion does not indicate an interaction with another attendee. For example, a sneeze or stretching by an attendee is a temporary motion that generates motion data, however it does not suggest an interaction with another attendee. The detection unit 204 can be trained to recognize motions associated with these temporary motions. The detection unit 204 is further operable to receive audio data to determine whether an attendee is interacting with another attendee. The detection unit 204 can employ natural language processing techniques to analyze the audio to determine whether an attendee is having a conversation with another attendee. For example, the detection unit 204 can compare names uttered by an attendee with names provided the attendees when entering a teleconference. By comparing the names, the detection unit 204 can determine which attendee is speaking with which attendee. The audio data can be coupled with motion and position data to determine whether an attendee is interacting with another attendee. If the detection unit 204 determines that an interaction between attendee is occurring, the detection unit 204 transmits the data to the interaction converter 106.

The sensors 206 include image, motion, depth, inertial, magnetic, gravity-field, location, and audio capturing sensors. The sensors 206 include, but are not limited to, a camera, a gyroscope, an accelerometer, location-based circuitry for interfacing with a global positioning system. The sensors 206 are operable to collect data from the environment for three-dimensional analysis, including determining a position and dimension of an object. To enable the three-dimensional analysis, the sensors are operable to capture shadows, lighting, and reflectivity of the surfaces of objects. The sensors 206 continuously collect data during a teleconference to determine an attendee's field of view through the display 202 and a positioning of the attendees.

Figure 3:
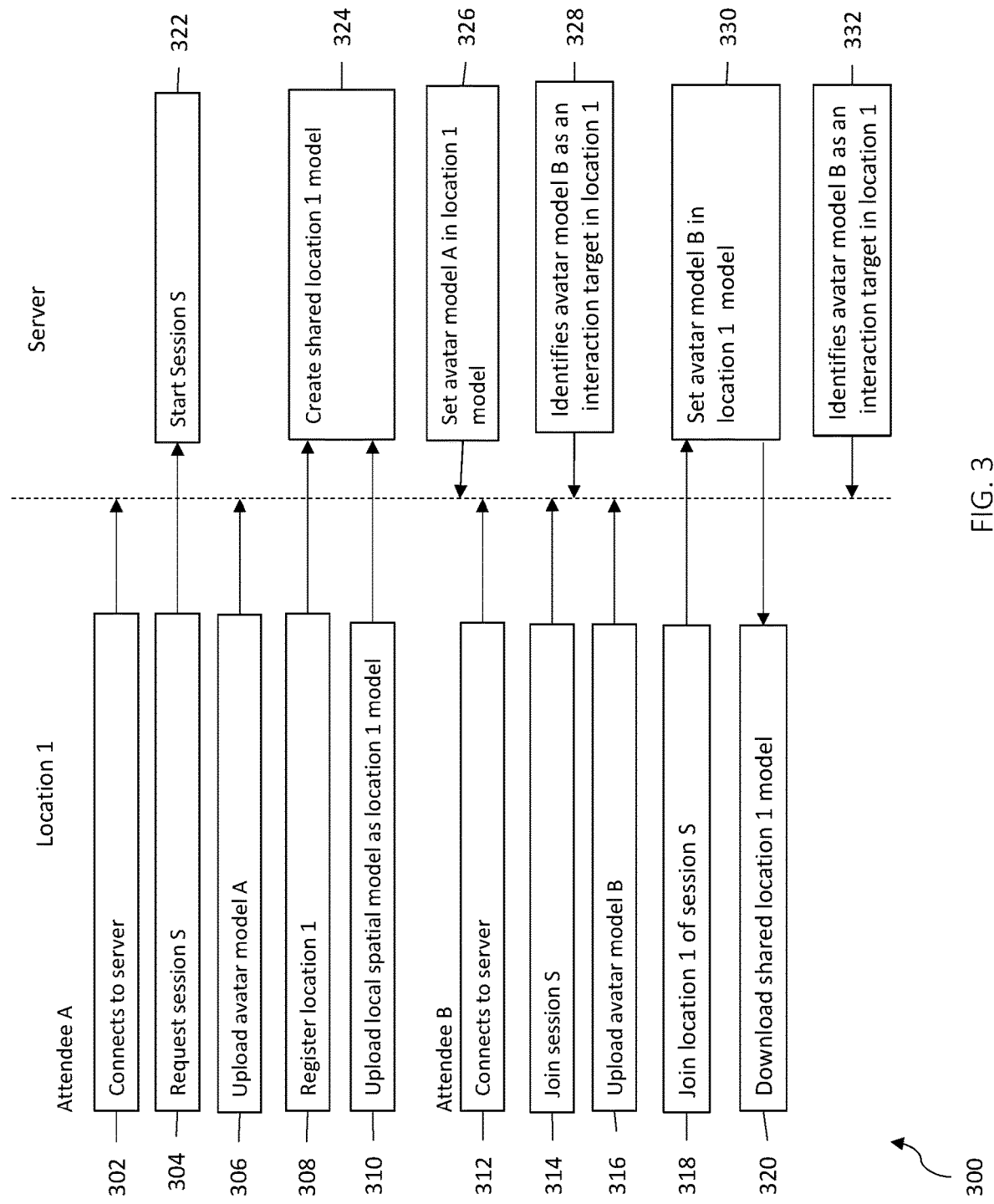
FIG. 3 illustrates a flow diagram of a process for initiating a mixed-reality teleconference in accordance with one or more embodiments of the present invention.

Referring to FIGS. 3-6, methods are described for various stages of creating a mixed-reality teleconference in accordance with one or more embodiments of the present invention. For illustrative purposes, the methods are described with reference to attendees A and B at a first location and attendee C and D at a second distinct location. Referring to FIG. 3, a method 300 for initiating a mixed-reality teleconference session from the same location attendees' perspective and a server's perspective. At block 302, attendee A uses their device to connect to a server. Attendee A can, for example, use their device to access a teleconferencing website to connect to the server. At block 304, attendee A requests a mixed-reality teleconference S. Once attendee A accesses the website, attendee A can enter their identification information and passcode to request that the server initiate a mixed-reality teleconference.

At block 306, attendee A uploads or causes to upload an avatar to the server. The avatar is a three-dimensional graphical representation of attendee A. The avatar can be a three-dimensional human-like representation, and resemble attendee A. The avatar can be pre-constructed or selected from a suite of available avatar models.

At block 308, a first location where attendee A is situated, is registered by attendee A's device. Registration includes using a local computing device to generate a three-dimensional spatial model of the first location. The server collects sensor-based data to not only map the structure of the teleconference location, for example, the dimensions of the room, but also to map the furniture, visual aids, and any attendees. The sensor-based data can be collected via an HMD worn by an attendee or a remote device such as sensors arranged around a teleconference room. At block 310, attendee A's device uploads the three-dimensional spatial model of the first location to the server.

At block 312, attendee B uses a computing device to connect to the server. Attendee B can, for example, use their device to access the same teleconferencing website as attendee A to connect to the server. Attendee B can enter identifying information and request to access the server. The server can authenticate attendee B's credentials and grant or disallow access to the server.

At block 314, attendee B joins teleconference S, and at block 316, attendee B uploads an avatar model to the server. At this point, the system can compare the avatar models uploaded by attendee A and attendee B and determine whether they are the same avatar model. If in the instance, the two avatar models are the same, the server can issue an alert with proposed modifications, such as color changes, virtual names tags, etc. to attendees A and B. Attendee A and B can modify their avatars such that attendee A is not confused with attendee B.

At block 318, attendee B joins teleconference S, and at block 320, attendee B downloads the three-dimensional spatial model of the first location to their computing device. Attendee B's computing device can now transmit sensor-based data to the server. For example, a chair is moved outside of an image captured by attendee A's device, however, attendee B's device captures the chair being moved. This data can be transmitted to the server to update the model. From the server's perspective, in response to a request from attendee A, the server initiates a mixed-reality teleconference at block 322.

At block 324, the server receives the three-dimensional spatial model from attendee A and initializes a shared three-dimensional spatial model for the first location. In some embodiments of the present invention, an attendee's device can generate a spatial model. For example, an HMD can collect data using image sensors and depth sensor, and use the data to generate a local spatial model of the teleconference location that attendee A is situated.

At block 326, the server introduces an avatar model for attendee A into the shared three-dimensional spatial model for the first location. The avatar model is a mathematical description of a three-dimensional illustration of attendee A. The avatar generated by the model can include a cartoon character, realistic depiction, animal, or other depiction. The avatar's motion is based on inputting sensor data describing attendee A's motion into the model and outputting a motion direction for the avatar. For example, an HMD can detect the user's location and orientation using a head-tracking sensor, detect hands by hand-tracking sensor, eye movement by eye-tracking sensor, facial expressions using a face-tracking sensor, and leg and body using additional sensors. These detected motions can be mapped to and inputted into the avatar model. The avatar model, can in turn, output corresponding motions in relation to the location for an avatar. At block 328, in response to attendee B joining the teleconference, the server introduces an avatar model for attendee B to the shared three-dimensional spatial model for the first location.

Figure 4:
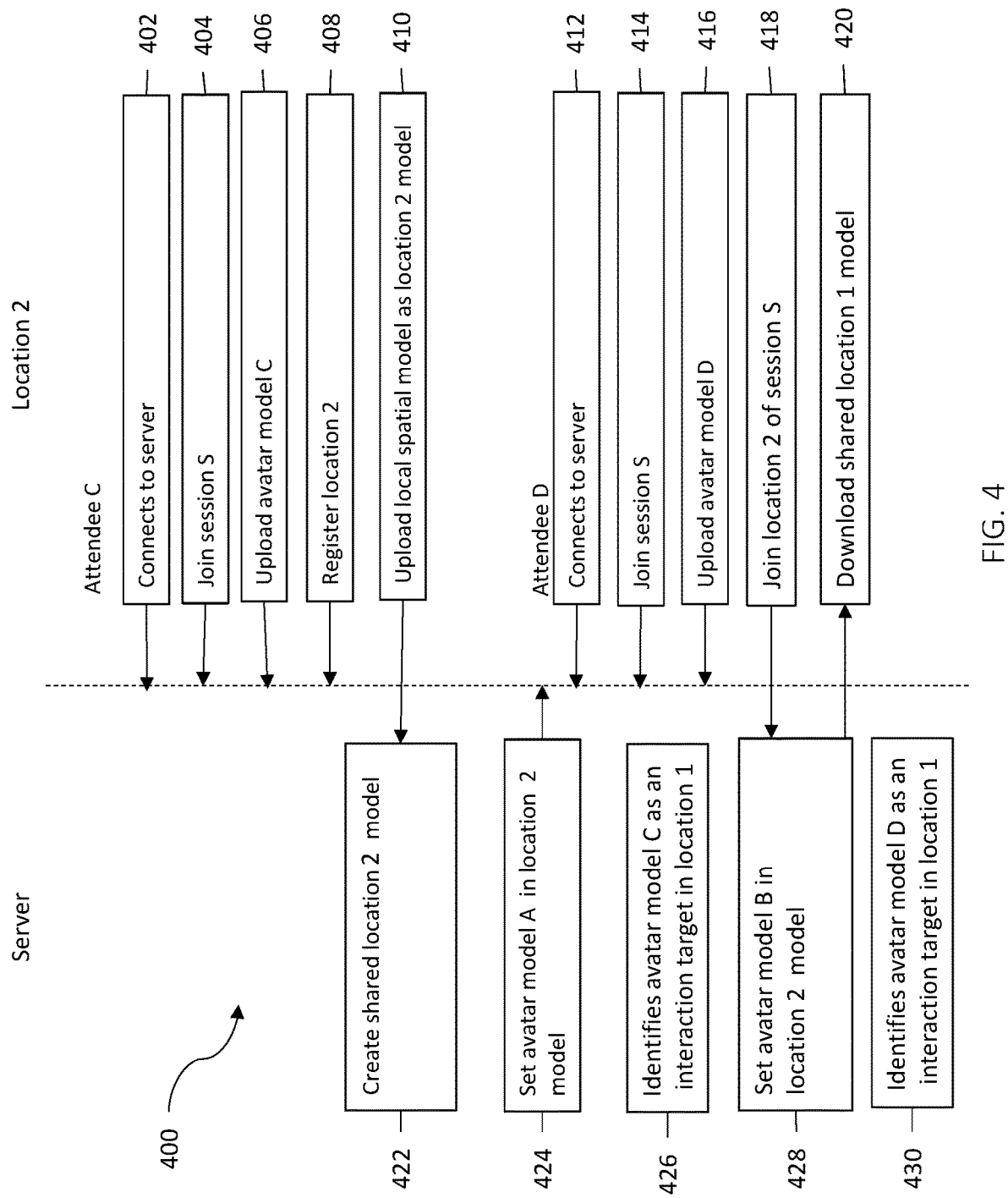
FIG. 4 illustrates a flow diagram of a process for initiating a mixed-reality teleconference in accordance with one or more embodiments of the present invention.

Referring to FIG. 4, a method 400 for initiating a mixed-reality teleconference session from the same location attendees' perspective and a server's perspective is shown. At block 402, attendee C uses a computing device to connect to the server, and at block 404 attendee C joins the mixed-reality teleconference. Attendee C can, for example, use their device to access the same teleconferencing website as attendee A and attendee B to connect to the server. Attendee C can enter identifying credentials through the teleconferencing website, and the server can grant or disallow permission to join the mixed-reality teleconference.

At block 406, attendee C uploads an avatar model to the server. The avatar generated by the model can be a three-dimensional representation of attendee C. The avatar can be pre-constructed or selected from a suite of available avatar models. The avatar can be stored on attendee's C's computing device, a remote device, or the server.

At block 408, attendee C registers the second location, which includes using a local computing device to generate a three-dimensional spatial model of the second location. As attendee C joins the teleconference, an avatar of attendee C is visible on attendee A and attendee B's devices. The avatars are positionally overlaid over a same real-world location on both attendee A and attendee B's display. For example, both attendee A and attendee B can see an avatar displayed on their respective devices sitting at a same chair. However, the avatar would appear different to each attendee based on an angle of attendee's device and a distance from the chair.

At block 410, the three-dimensional spatial model of the second location is uploaded to the server. At block 412, attendee D uses a computing device to connect to the server. Attendee D can, for example, use their device to access the same teleconferencing website as attendee A, attendee B, and attendee C to connect to the server. Attendee D can similarly verify their identity through the teleconferencing website and join the mixed-reality teleconference.

At block 414, attendee D joins teleconference S, and at block 416 attendee D uploads an avatar model to the server.

The avatar generated by the model for attendee D can be pre-constructed or selected from a suite of available avatar models. The avatar can be stored on attendee's D's computing device, a remote device, or the server.

At block 418 attendee D joins teleconference S, and at block 420, attendee D downloads the three-dimensional spatial model of the first location. Attendee D's avatar is visible to attendees A and B through their respective devices. As attendees A and B view the real world first location, attendee D's avatar is seen imposed at the first location.

From the server's perspective, in response to a request from attendee A, the server creates a shared location model for the second location at block 422. In some embodiments of the present invention, an attendee's device can generate a spatial model. For example, an HMD can generate local spatial model by using image sensors and depth sensor and using the data to generate a local spatial model of the teleconference location that the attendee is situated.

At block 424, the server sets the avatar model for attendee A to the three-dimensional spatial model of the second location. The avatar model for attendee A can now receive inputs relating to the physical layout of the second location. In this sense, the avatar for attendee A is responsive to the physical layout of the second location. For example, through Attendee C and D's devices, the avatar for attendee A would be seen as distinct from a physical object at the second location.

At block 426, the server identifies the avatar for attendee C as an interaction target. By setting attendee C as an interaction target, an avatar model is not updated based on an interaction between an attendee an inanimate object. Rather each avatar model will be updated based on an interaction with another attendee.

At block 428, the server sets an avatar model for attendee B into the shared three-dimensional spatial model for the second location. The avatar model for attendee B can now receive inputs relating to the physical layout of the second location. The avatar for attendee B is responsive to the physical layout of the second location. For example, through attendee C and D's devices, the avatar for attendee B would be seen as distinct from a physical object at the second location.

At block 430, the server identifies the avatar for attendee D as an interaction target. This can be performed by coding the avatar outputted from attendee D's avatar model to reflect that the avatar is an interaction target. Setting attendee D as an interaction target provides a focal point to direct a face of another attendee's avatar towards.

Figure 5:
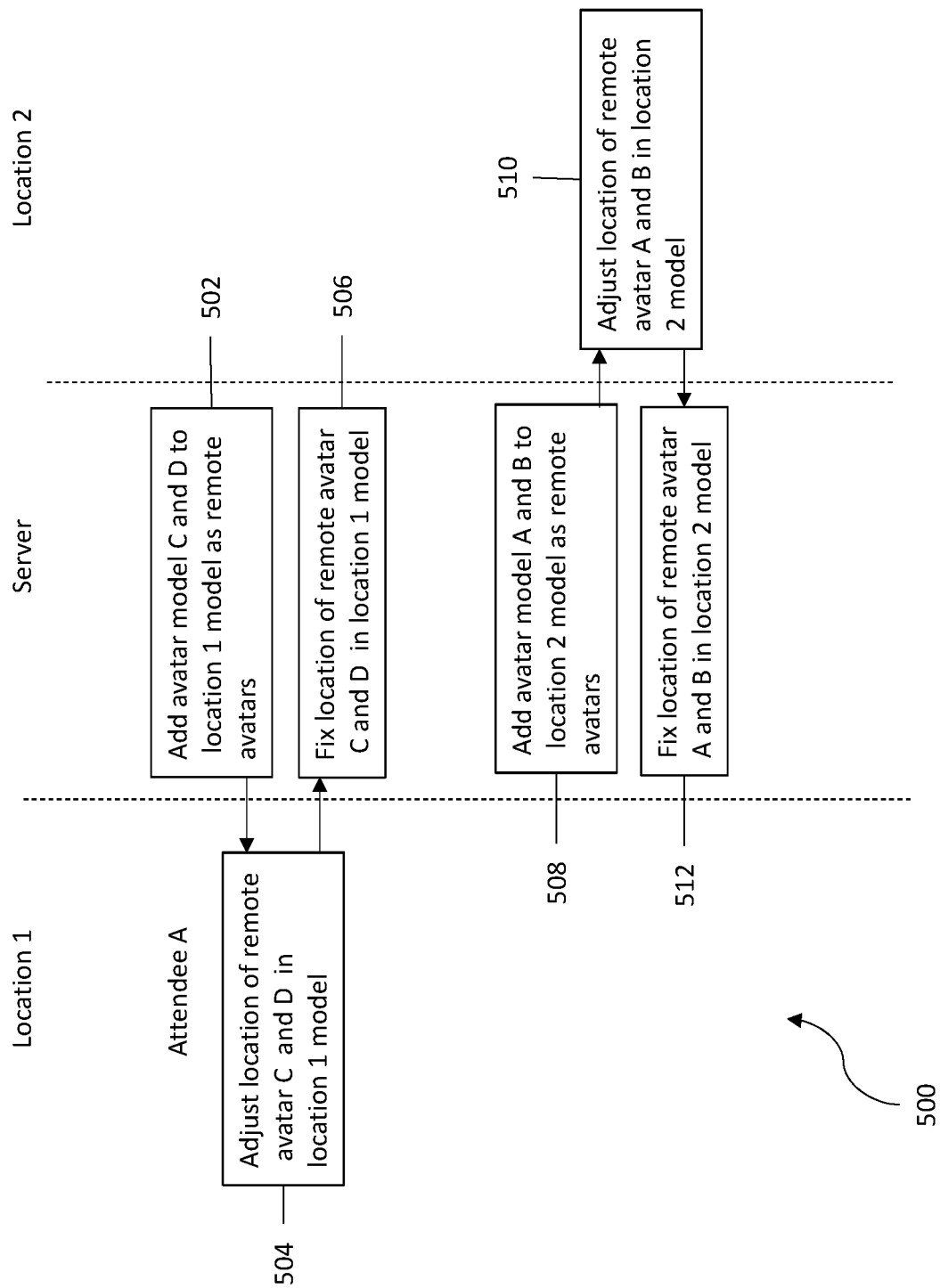
FIG. 5 illustrates a flow diagram of a process for generating a mixed-reality teleconference in accordance with one or more embodiments of the present invention.

Referring to FIG. 5, a method 500 for generating a shared mixed-reality teleconference session is shown. At block 502, the server adds a respective avatar model for attendee C and attendee D to the shared first location model. The avatar models for attendees C and D can now receive inputs relating to the physical layout of the first location. In this sense, the avatar for attendee A is responsive to the physical layout of the second location.

At block 504, the server adjusts an arrangement of the avatars to conform to the arrangement of the first location. For example, in an instance attendee C and D are seated side by side at the second location, but only a cross-facing seating is open at the first location, the server determines that avatars for attendees C and D will be displayed cross-facing from each other at the first location.

At block 506, the server sets avatars for attendees C and D and fixes the location of avatars C and D in the three-dimensional spatial model for the first location. Using the example above, the server sets avatars for attendees C and D to be displayed across from each other at the first location.

At block 508, the server adds a respective avatar model for attendee A and attendee B to the three-dimensional spatial model of the second location. The avatar models for attendees A and B can now receive inputs relating to the physical layout of the second location. At block 510, the server adjusts an arrangement of the avatars of attendees A and B to conform to the arrangement of the second location. Similar to above, the server determines a position at the second location for the avatars of attendees A and B to be displayed. At block 512, the server fixes the location of avatars for attendees A and B in the three-dimensional spatial model for the second location.

Figure 6:
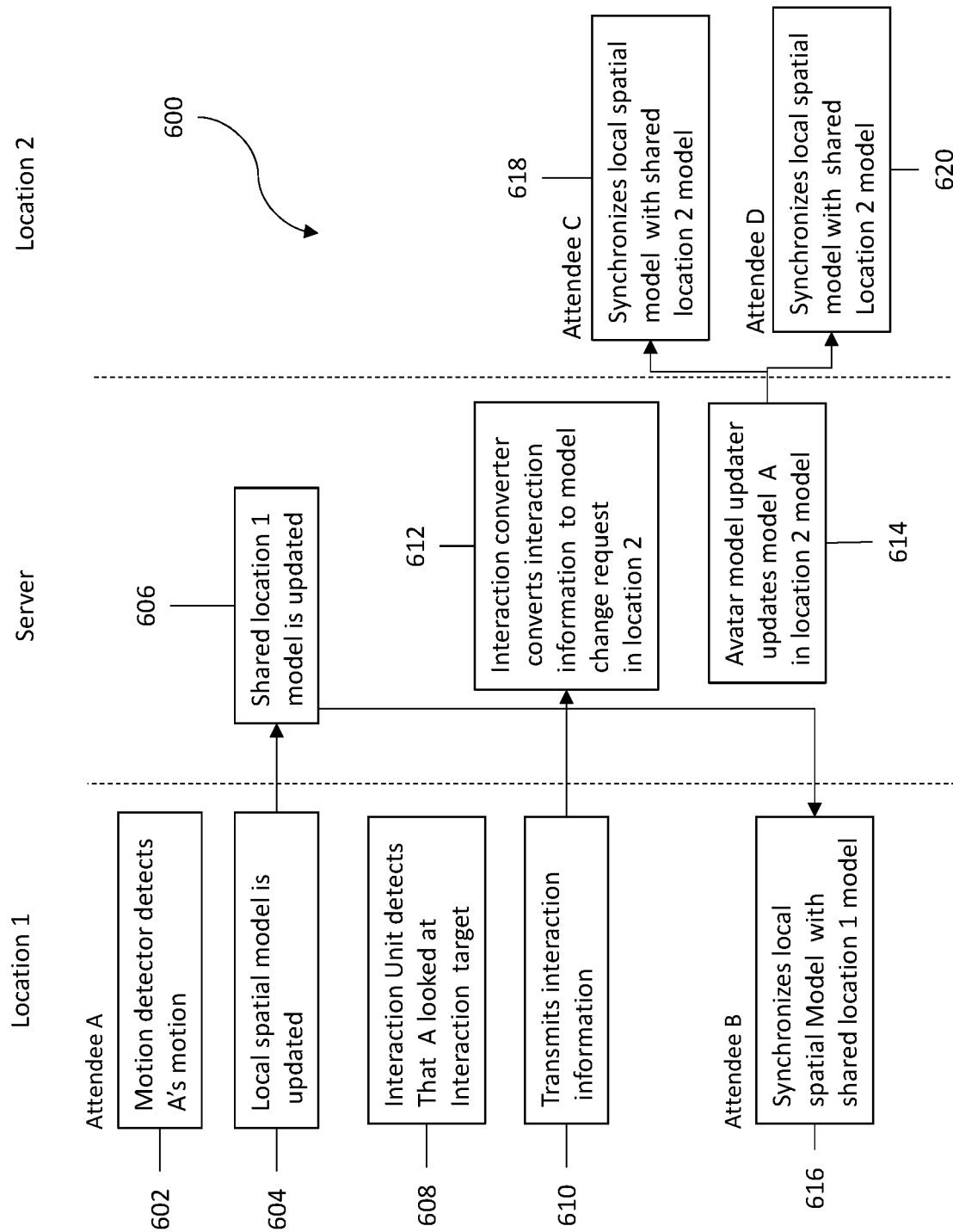
FIG. 6 illustrates a flow diagram of a process for a mixed-reality teleconference in accordance with one or more embodiments of the present invention.

Referring to FIG. 6, a method 600 for generating an interaction during a mixed-reality teleconference is shown. At block 602, a motion detector detects attendee A's motion. For example, attendee A can turn their body thirty degrees to the left, and the system can detect this movement. At block 604, a local spatial model stored on attendee A's computing device is updated to reflect the movement.

At block 606, the server updates a shared location model to reflect the motion of attendee A. For example, either sensors arranged on attendee A, sensors arranged on attendee B, or sensors arranged at the teleconference location detect attendee A rotated their head fifteen degrees in the direction of attendee C. The server can input this data into the avatar model for attendee A to cause the avatar to rotate an appropriate number of degrees towards attendee C.

At block 608, attendee A's computing device determines, based on attendee A's motion, that attendee A is looking at an interaction target, attendee C. As a continuation to the example, above, an avatar of attendee C becomes visible in attendee's A device as attendee A's rotates and in turn attendee A's avatar is displayed turning toward attendee C in the display of attendee C and D's devices.

At block 610, attendee A's computing device transmits data to the server that attendee A is looking at attendee C. Attendee C has been identified as an interaction target. Therefore, even if attendee C was arranged near an inanimate object, for example, a cabinet the server would cause the avatar of attendee A to appear to look at attendee C.

At block 614, the server updates a shared three-dimensional spatial model to reflect attendee A is looking at attendee C. Therefore, as attendee C views attendee A through attendee C's device, the avatar of attendee A will be displayed looking at attendee C. At block 616, a location model stored on attendee B's computing device is synchronized with the updated three-dimensional spatial model stored on the server. The synchronization inputs data into the location model to reflect that attendee A is looking at attendee C.

At blocks 618 and 620 the local spatial models respectively stored on attendee C and D devices are synchronized to display an avatar of attendee A facing towards attendee C. In other words, the avatar of attendee A will appear to face attendee C on each of attendee C and D's devices.

In some embodiments, avatars can further appear to be responsive to environmental stimuli at a teleconference location. Each attendee device can be equipped with audio, temperature, and other appropriate sensors. The sensors are operable to sense environmental stimuli at a teleconference location and an avatar visible at the location can react to the stimuli. For example, attendee A can be at a first location and an avatar of attendee A is visible on attendee B's device at a second location. Attendee B's device can be configured to sense environmental stimuli, for example, a sudden temperature drop, a loud noise, of sudden increase sunlight. The environmental stimuli data from one location can be transmitted to the server, which can update the avatar model when the attendee is at another location and unaware of the environmental stimuli. For example, an avatar of an attendee at a first location can squint their eyes in response to an increase in sunlight at a second location. An avatar can turn toward loud sound, even if the actual attendee cannot hear the sound.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
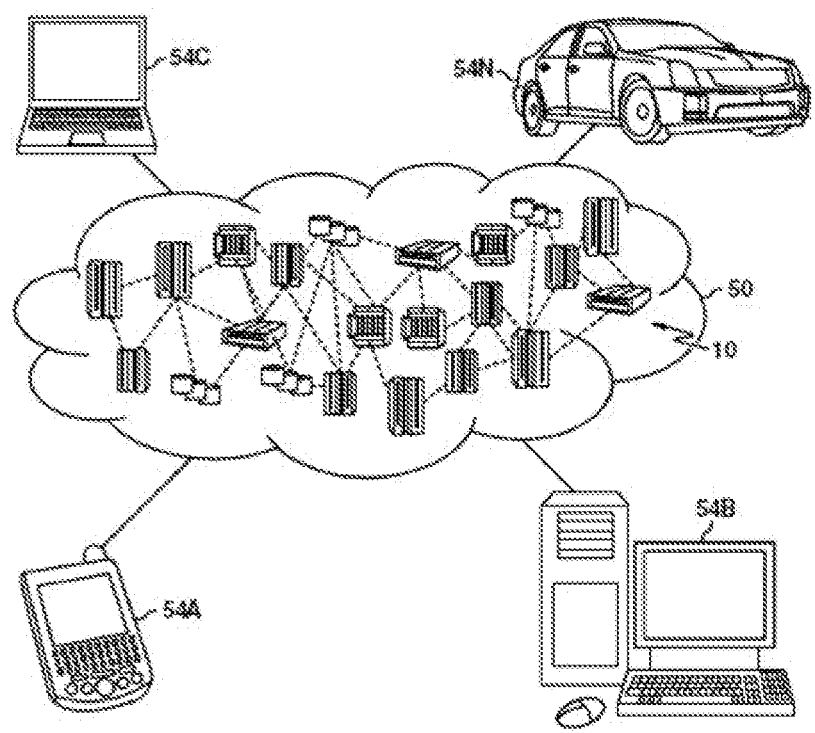
FIG. 7 depicts a cloud computing environment according to one or more embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
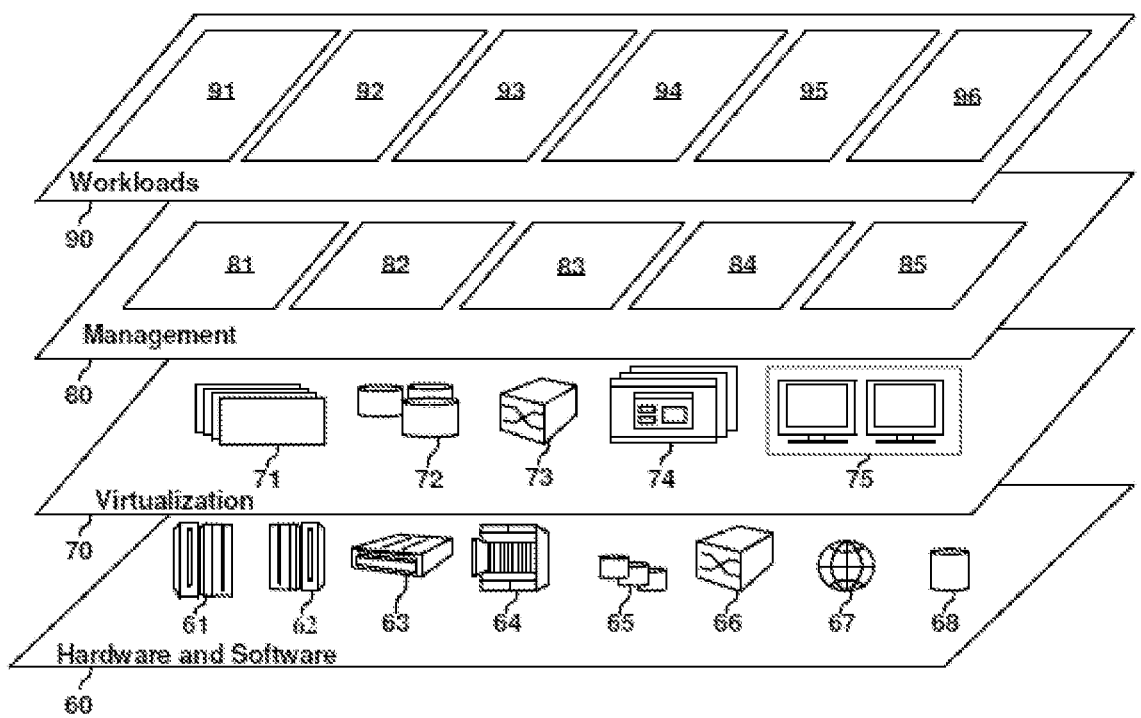
FIG. 8 depicts abstraction model layers according to one or more embodiments of the present invention.

Referring now to FIG. 8, a set of functional abstraction layers provided by cloud computing environment 50 (FIG. 7) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and creating a mixed-reality teleconferencing environment 96.

Figure 9:
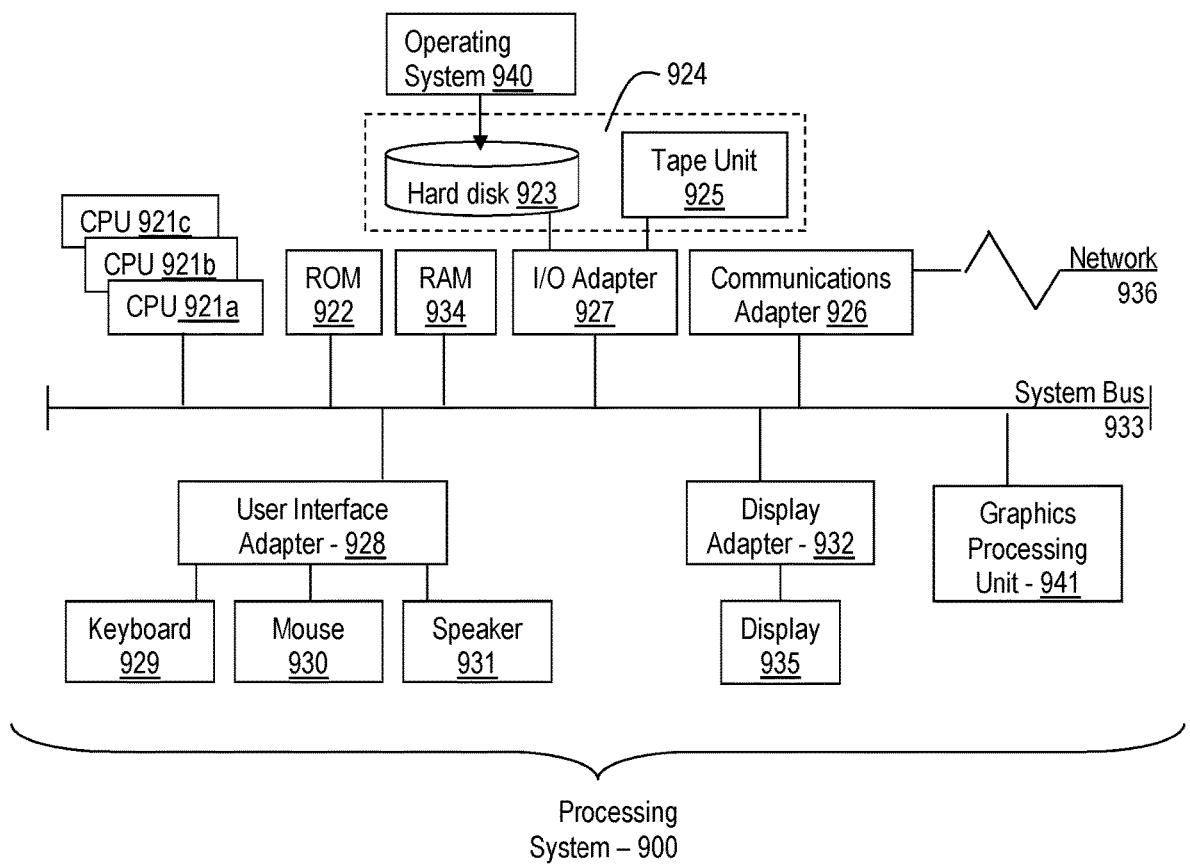
FIG. 9 depicts a block diagram of a computer system for use in implementing one or more embodiments of the present invention.

It is understood that the present disclosure is capable of being implemented in conjunction with any other type of computing environment now known or later developed. For example, FIG. 9 depicts a block diagram of a processing system 900 for implementing the techniques described herein. In examples, the processing system 900 has one or more central processing units (processors) 921*a*, 921*b*, 921*c*, etc. (collectively or generically referred to as processor(s) 921 and/or as processing device(s)). In aspects of the present disclosure, each processor 921 can include a reduced instruction set computer (RISC) microprocessor. Processors 921 are coupled to system memory (e.g., random access memory (RAM) 924) and various other components via a system bus 933. Read only memory (ROM) 922 is coupled to system bus 933 and may include a basic input/output system (BIOS), which controls certain basic functions of the processing system 900.

Further depicted are an input/output (I/O) adapter 927 and a network adapter 926 coupled to the system bus 933. I/O adapter 927 may be a small computer system interface (SCSI) adapter that communicates with a hard disk 923 and/or a storage device 925 or any other similar component. I/O adapter 927, hard disk 923, and storage device 925 are collectively referred to herein as mass storage 934. Operating system 940 for execution on processing system 900 may be stored in mass storage 934. The network adapter 926 interconnects system bus 933 with an outside network 936 enabling processing system 900 to communicate with other such systems.

A display (e.g., a display monitor) 935 is connected to the system bus 933 by display adapter 932, which may include a graphics adapter to improve the performance of graphics intensive applications and a video controller. In one aspect of the present disclosure, adapters 926, 927, and/or 932 may be connected to one or more I/O busses that are connected to the system bus 933 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 933 via user interface adapter 928 and display adapter 932. An input device 929 (e.g., a keyboard, a microphone, a touchscreen, etc.), an input pointer 930 (e.g., a mouse, trackpad, touchscreen, etc.), and/or a speaker 931 may be interconnected to system bus 933 via user interface adapter 928, which may include, for example, a Super I/O chip integrating multiple device adapters into a single integrated circuit.

In some aspects of the present disclosure, the processing system 900 includes a graphics processing unit 937. Graphics processing unit 937 is a specialized electronic circuit designed to manipulate and alter memory to accelerate the creation of images in a frame buffer intended for output to a display. In general, graphics processing unit 937 is very efficient at manipulating computer graphics and image processing and has a highly parallel structure that makes it more effective than general-purpose CPUs for algorithms where processing of large blocks of data is done in parallel.

Thus, as configured herein, the processing system 900 includes processing capability in the form of processors 921, storage capability including system memory (e.g., RAM 924), and mass storage 934, input means such as keyboard 929 and mouse 930, and output capability including speaker 931 and display 935. In some aspects of the present disclosure, a portion of system memory (e.g., RAM 924) and mass storage 934 collectively store the operating system 940 to coordinate the functions of the various components shown in the processing system 900.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    detecting, by a processor, a position of a first user seated at a first conference table at a second location;
    detecting, by the processor, a position of a second user seated at a second conference table at a first location;
    overlaying, by the processor, a graphical representation of a first user onto a real-world image of second conference table at the first location, wherein the graphical representation of a first user is overlayed at the second conference table based on the position of the second user at the second conference table;
    overlaying, by the processor, a graphical representation of the second user onto a real-world image of first conference table at the second location, wherein the graphical representation of a second user is overlayed at the first conference table based on the position of the first user at the first conference table;
    designating, by the processor, the graphical representation of the first user and the graphical representation of the second user as interaction targets;
    detecting, by the processor, an interaction between the first user and a second user, wherein the second user is physically located at the first location;
    determining, by the processor, a current position of the second user at the first location;
    causing, by the processor, the graphical representation of the first user to face in a direction of the current position of the second user based on the designation as interaction targets.

2. The computer-implemented method of claim 1, wherein detecting an interaction between the first user and the second user comprises:
    calculating a position and a field of view of a computing device of the first user;
    detecting a position of a computing device of the second user; and comparing the position and field of view of the first user's computing device with the position of the second user's computing device.

3. The computer-implemented method of claim 1, wherein detecting an interaction between the first user and the second user comprises:
   detecting the graphical representation of the first user on a display of computing device of the second user;
   determining whether a time interval that the graphical representation of the first user exceeds a threshold time.

4. The computer-implemented method of claim 1 further comprising:
   sharing a model of the second location with a computing device of a third user, wherein the third user is physically located at the second location.

5. A system comprising:
   a memory having computer readable instructions; and
   one or more processors for executing the computer readable instructions, the computer readable instructions controlling the one or more processors to perform operations comprising:
   detecting a position of a first user seated at a first conference table at a second location;
   detecting a position of a second user seated at a second conference table at a first location;
   overlaying a graphical representation of a first user onto a real-world image of second conference table at the first location, wherein the graphical representation of a first user is overlayed at the second conference table based on the position of the second user at the second conference table;
   overlaying, by the processor, a graphical representation of the second user onto a real-world image of first conference table at the second location, wherein the graphical representation of a second user is overlayed at the first conference table based on the position of the first user at the first conference table;
   designating, by the processor, the graphical representation of the first user and the graphical representation of the second user as interaction targets;
   detecting an interaction between the first user and a second user, wherein the second user is physically located at the first location;
   determining a current position of the second user at the first location;
   causing the graphical representation of the first user to face in a direction of the current position of the second user based on the designation as interaction targets.

6. The system of claim 5, wherein detecting an interaction between the first user and the second user comprises:
   calculating a position and a field of view of a computing device of the first user;
   detecting a position of a computing device of the second user; and
   comparing the position and field of view of the first user's computing device with the position of the second user's computing device.

7. The system of claim 5, wherein detecting an interaction between the first user and the second user comprises:
   detecting the graphical representation of the first user on a display of computing device of the second user;
   determining whether a time interval that the graphical representation of the first user exceeds a threshold time.

8. The system of claim 5, the operations further comprising:
   sharing a model of the second location with a computing device of a third user, wherein the third user is physically located at the second location.

9. A computer program product comprising a computer readable storage medium having program instructions embodied therewith, the program instructions executable by a processor to cause the processor to perform operations comprising:
   detecting a position of a first user seated at a first conference table at a second location;
   detecting a position of a second user seated at a second conference table at a first location;
   overlaying a graphical representation of a first user onto a real-world image of second conference table at the first location, wherein the graphical representation of a first user is overlayed at the based on the position of the second user at the second conference table;
   overlaying, by the processor, a graphical representation of the second user onto a real-world image of first conference table at the second location, wherein the graphical representation of a second user is overlayed at the first conference table based on the position of the first user at the first conference table;
   designating, by the processor, the graphical representation of the first user and the graphical representation of the second user as interaction targets;
   detecting an interaction between the first user and a second user, wherein the second user is physically located at the first location;
   determining a current position of the second user at the first location;
   causing the graphical representation of the first user to face in a direction of the current position of the second user based on the designation as interaction targets.

10. The computer program product of claim 9, wherein detecting an interaction between the first user and the second user comprises:
    calculating a position and a field of view of a computing device of the first user;
    detecting a position of a computing device of the second user; and
    comparing the position and field of view of the first user's computing device with the position of the second user's computing device.

11. The computer program product of claim 9, wherein detecting an interaction between the first user and the second user comprises:
    detecting the graphical representation of the first user on a display of computing device of the second user;
    determining whether a time interval that the graphical representation of the first user exceeds a threshold time.

* * * * *